(12) United States Patent  
Goulet

(10) Patent No.: US 11,692,654 B2
(45) Date of Patent: Jul. 4, 2023

(54) CORRUGATED BAND CLAMP

(71) Applicant: SAPREX, LLC, Gastonia, NC (US)

(72) Inventor: Robert Jacque Goulet, Gastonia, NC (US)

(73) Assignee: NELSON GLOBAL PRODUCTS, INC., Stoughton, WI (US)

( * ) Notice: Subject to any disclaimer, the term of this patent is extended or adjusted under 35 U.S.C. 154(b) by 411 days.

(21) Appl. No.: 16/090,084

(22) PCT Filed: Mar. 30, 2017

(86) PCT No.: PCT/US2017/025020
§ 371 (c)(1),
(2) Date: Sep. 28, 2018

(87) PCT Pub. No.: WO2017/173078
PCT Pub. Date: Oct. 5, 2017

(65) Prior Publication Data
US 2019/0107233 A1    Apr. 11, 2019

Related U.S. Application Data

(60) Provisional application No. 62/315,484, filed on Mar. 30, 2016.

(51) Int. Cl.
F16L 33/08    (2006.01)
F16L 21/06    (2006.01)
(Continued)

(52) U.S. Cl.
CPC .............. F16L 33/08 (2013.01); B25B 5/10 (2013.01); F16L 21/065 (2013.01); F16B 2/065 (2013.01); F16B 2/08 (2013.01); Y10T 29/49826 (2015.01)

(58) Field of Classification Search
CPC ....... F16L 33/08; F16L 21/065; F16L 33/025; F16L 3/1211; F16L 33/10; F16L 27/107; B25B 5/10; Y10T 24/1427
(Continued)

(56) References Cited

U.S. PATENT DOCUMENTS 440,999 A * 11/1890 Frost
758,820 A *  5/1904 Chaplin
(Continued)

FOREIGN PATENT DOCUMENTS

GB         1122039 A     7/1968
GB         1138064 A  * 12/1968  .............. F16L 33/08
WO    2005085608 A1     9/2005

OTHER PUBLICATIONS

International Search Report dated Dec. 29, 2017, for related International Patent Application No. PCT/US2017/025020.
(Continued)

Primary Examiner — Zachary T Dragicevich
Assistant Examiner — William S. Choi
(74) Attorney, Agent, or Firm — Moore & Van Allen PLLC; Henry B. Ward, III

(57) ABSTRACT

A corrugated band clamp is configured to effectively secure a sleeve around a pipe. The corrugated band clamp comprises an elongate member having a first lateral side and an opposing second lateral side. Typically, at least a portion of the length of the elongate member comprises a corrugated portion and at least a portion of the length of the elongate member comprises a non-corrugated portion. The corrugated portion of the elongate member enables the corrugated band clamp to effectively secure sleeves on pipes with non-parallel surfaces. In addition, applications of the corrugated band clamp system, methods of manufacture and methods of use are provided.

11 Claims, 9 Drawing Sheets

(51) Int. Cl.
*F16B 2/08* (2006.01)
*F16B 2/06* (2006.01)
*B25B 5/10* (2006.01)

(58) Field of Classification Search
USPC .... 285/420, 252, 337, 365, 407, 403, 154.3, 285/256; 24/274 R, 19, 20 CW, 279, 24/274 WB, 20 LS
See application file for complete search history.

(56) References Cited

U.S. PATENT DOCUMENTS

| | | | |
|---|---|---|---|
| 2,424,436 A | | 7/1947 | Crater |
| 2,717,788 A | | 9/1955 | Raynes |
| 3,053,715 A | | 9/1962 | Labino |
| 3,990,151 A | * | 11/1976 | Kesling |
| 4,026,586 A | * | 5/1977 | Kennedy, Jr. ............... 285/236 |
| 4,402,113 A | * | 9/1983 | Smith ........................ 24/20 R |
| 5,706,558 A | * | 1/1998 | Sauer ...................... 24/20 CW |
| 5,985,385 A | | 11/1999 | Gottfried |
| 6,102,446 A | * | 8/2000 | Thomas ..................... 24/23 R |
| 8,443,492 B2 | * | 5/2013 | Racoillet |
| 2007/0022578 A1 | | 2/2007 | Crockett, IV et al. |
| 2008/0224464 A1 | | 9/2008 | Krausz et al. |
| 2013/0032110 A1 | * | 2/2013 | David |
| 2015/0292655 A1 | * | 10/2015 | Sulka ..................... F16L 33/08 285/420 |

OTHER PUBLICATIONS

Written Opinion dated Dec. 29, 2017, for related International Patent Application No. PCT/US2017/025020.

International Preliminary Report on Patentability dated Oct. 2, 2018, for related International Patent Application No. PCT/US2017/025020.

* cited by examiner

CORRUGATED BAND CLAMP

FIELD OF THE INVENTION

Embodiments disclosed herein relate to clamping devices generally and band clamps in particular.

BRIEF SUMMARY

Embodiments of the invention are directed to a corrugated band clamp comprising an elongate member having a first lateral side and an opposing second lateral side, and a predetermined width extending therebetween, the elongate member having a predetermined length; wherein, at least a portion of the length of the elongate member comprises a corrugated portion and at least a portion of the length of the elongate member comprises a non-corrugated portion.

In some embodiments, and in combination with the above embodiment, the first lateral side defines a first length comprising the corrugated portion and a second length comprising the non-corrugated portion.

In some embodiments, and in combination with any of the above embodiments, the corrugated portion is positioned on the first lateral side, wherein the corrugated portion defines a depth extending along at least a portion of the width of the elongate member.

In some embodiments, and in combination with any of the above embodiments, the depth of the corrugated portion is a predetermined constant.

In some embodiments, and in combination with any of the above embodiments, the depth of the corrugated portion is variable along the length of the elongate member.

In some embodiments, and in combination with any of the above embodiments, the elongate member defines a first end and an opposing second end, wherein the band clamp further comprises a clamping member, wherein the clamping member is configured to secure the first and second ends relative to one another to form a loop.

Some embodiments of the invention are directed to a corrugated band clamp system, comprising: a band clamp, wherein the band clamp comprises an elongate member having a first lateral side and an opposing second lateral side, and a predetermined width extending therebetween, the elongate member having a predetermined length; wherein, at least a portion of the length of the elongate member comprises a corrugated portion and at least a portion of the length of the elongate member comprises a non-corrugated portion; a pipe, the pipe having an outer surface; wherein, the band clamp is positioned and secured at the outer surface of the pipe.

In some embodiments, and in combination with any of the above embodiments, the elongate member defines a first end and an opposing second end, wherein the system further comprises: a clamping member, wherein the first and second ends are secured relative to one another by the clamping member.

In some embodiments, and in combination with any of the above embodiments, the system further comprises an insulating material positioned around at least a portion of the outer surface of the pipe, wherein the insulating material is secured between the band clamp and the outer surface of the pipe.

In some embodiments, and in combination with any of the above embodiments, the system further comprises a second band clamp, wherein the second band clamp is entirely of a non-corrugated nature.

In some embodiments, and in combination with any of the above embodiments, wherein the system further comprises a retaining member, wherein the retaining member is configured to secure the band clamp and the second band clamp together.

Some embodiments of the invention are directed to a method of manufacturing a corrugated band clamp, the method comprising providing an elongate member having a first lateral side and an opposing second lateral side, and a predetermined width extending therebetween, the elongate member having a predetermined length, wherein the elongate member defines a first end and an opposing second end; forming a corrugated portion along at least a portion of the length of the elongate member such that at least a first portion of the length of the elongate member comprises the corrugated portion and at least a second portion of the length of the elongate member comprises a non-corrugated portion; and providing a clamping member, wherein the clamping member is configured to secure the first and second ends relative to one another to form a loop. In some embodiments, the method further comprises securing the clamping member to the elongate member.

Some embodiments of the invention are directed to a method of using a corrugated band clamp, the method comprising providing a corrugated band clamp, wherein the corrugated band clamp comprises: an elongate member having a first lateral side and an opposing second lateral side, and a predetermined width extending therebetween, the elongate member having a predetermined length, wherein the elongate member defines a first end and an opposing second end; wherein, at least a portion of the length of the elongate member comprises a corrugated portion and at least a portion of the length of the elongate member comprises a non-corrugated portion; providing a clamping member, wherein the clamping member is configured to secure the first and second ends relative to one another to form a loop; providing a pipe, the pipe having an outer surface; positioning the corrugated band clamp proximate the outer surface of the pipe; positioning the first end and the second end in the clamping member, such that the corrugated band clamp forms a loop around the pipe; and securing the corrugated band clamp at the outer surface of the pipe, wherein securing the corrugated band clamp comprises modifying the dimensions of the loop. In some embodiments, positioning the corrugated band clamp proximate the outer surface of the pipe, further comprises: providing an insulating material; positioning the insulating material around at least a portion of the outer surface of the pipe; and positioning the corrugated band clamp proximate the insulating material such that the insulating material is secured between the band clamp and the outer surface of the pipe.

BRIEF DESCRIPTION OF THE DRAWINGS

The present embodiments are further described in the detailed description which follows in reference to the noted drawings by way of non-limiting examples of the present embodiments on which like reference numerals represent parts throughout the several views of the drawings.

The foregoing and other features of the invention, and the manner in which the same are accomplished, will become more readily apparent upon consideration of the following detail description of the invention taken in conjunction with the accompanying drawings, which illustrate non-limiting examples of embodiments of the present invention and which are not necessarily drawn to scale In the drawings:

FIG. 3b is a detailed perspective view illustrating the band clamp associated with the embodiment of FIG. 3a.

DETAILED DESCRIPTION OF EMBODIMENTS OF THE INVENTION

The following detailed description refers to the accompanying drawings, which illustrate specific embodiments. Other embodiments having different structures and operation do not depart from the scope of the present disclosure.

Certain terminology is used herein for convenience only and is not to be taken as a limitation on the embodiments described. For example, words such as "top", "bottom", "upper," "lower," "left," "right," "horizontal," "vertical," "upward," and "downward" merely describe the configuration shown in the figures. Indeed, the referenced components may be oriented in any direction and the terminology, therefore, should be understood as encompassing such variations unless specified otherwise. Throughout this disclosure, where a process or method is shown or described, the method may be performed in any order or simultaneously, unless it is clear from the context that the method depends on certain actions being performed first.

Conventional band and clamps are typically utilized to attach two or more members coaxially (for example, two pipes), to attach sleeves over a pipe or hose, to attach hoses and the like onto the pipe, and to provide structural support. The band clamps are typically required to provide radial compression to hold the two or more members together. In this regard, the area of contact between the inner surface of band clamp and the pipe surface is crucial. Many practical applications of piping and tubing require the pipes, tubes, or ducts to have bends/curves. However, bending a pipe often causes a reduction in thickness along the outer radius (larger radius) due to increase in length and increase in thickness along the inner radius (smaller radius) of the bend/elbow. Often the outer surface and the inner surfaces of the pipes are not parallel, specifically at locations proximate to the bend in the pipe. In other instances, the pipes may be tapered at various locations, and/or the curvature of the bend may be non-uniform, which cause a distortion in the parallelism of the original pipe (without the bend).

Figure 1:
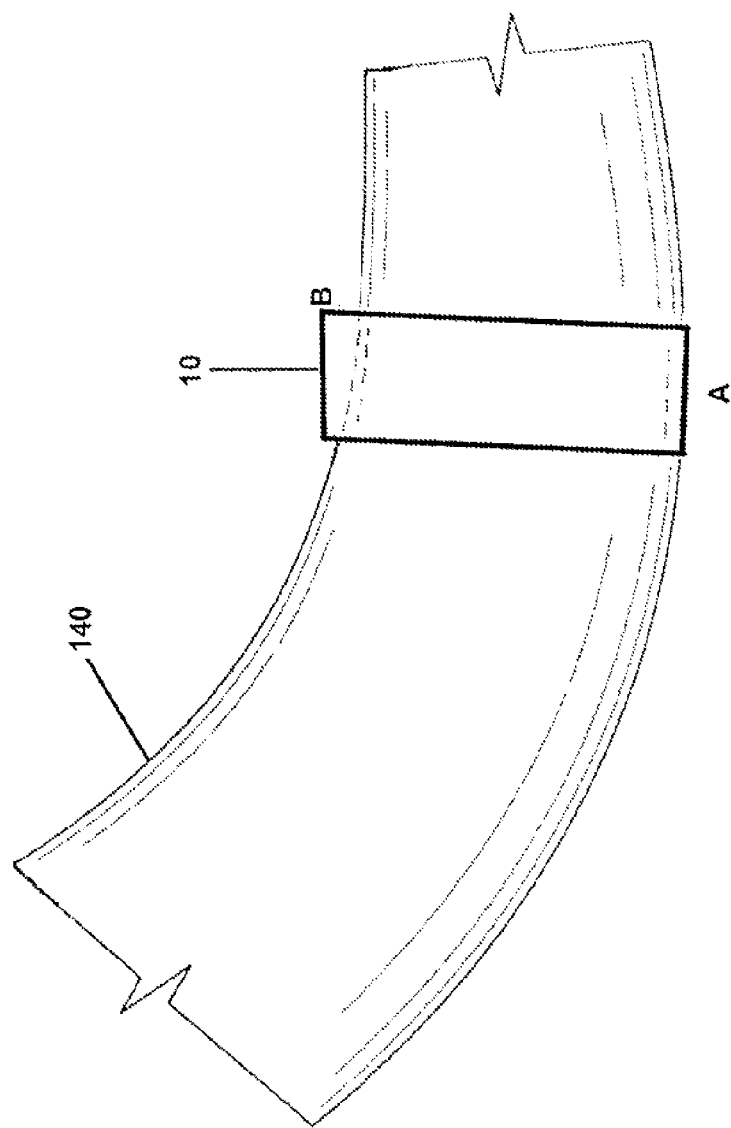
FIG. 1 is a front view illustrating a band clamp assembly without corrugated portions, in accordance with one embodiment of the invention.

Referring to the drawings, where like reference numerals refer to the same or similar parts, FIG. 1 illustrates a front view of a conventional band clamp 10 positioned around a curved or bent pipe 140. The convention band clamp 10 are substantially cylindrical in shape. During assembly, the conventional band clamp 10 is positioned around the curved pipe 140, such that the band is parallel to at least one of the outer or inner surfaces of the bend. FIG. 1 illustrates the conventional band clamp 10 being positioned parallel to the outer surface of the bend, such that the portion of the inner surface of the band 10 is in contact with the proximate portion of the outer surface of the pipe 140, as depicted by A. However, due to the irregular curve and/or non-parallelism of the surfaces of the pipe bend, the opposite portion of the conventional clamp fails to make contact with the inner surface of the pipe bend, as depicted at B. This lack of contact may be unfavorable since is the conventional band clamp fails to adequately secure the elements (for example, a sleeve around the pipe). Furthermore, in the instances where the pipe 140 is subjected to vibrations, the lack of contact, in conjunction with even mild vibrations may cause the conventional band clamp 10 to dislocate or move over a period of time, further failing to secure the elements. In other instances, the improper surface contact of the conventional band clamp 10 may fail to provide adequate structural support to the pipe 140 and may fail to limit the adverse effects of hoop stresses on the pipe 140.

Figure 2:
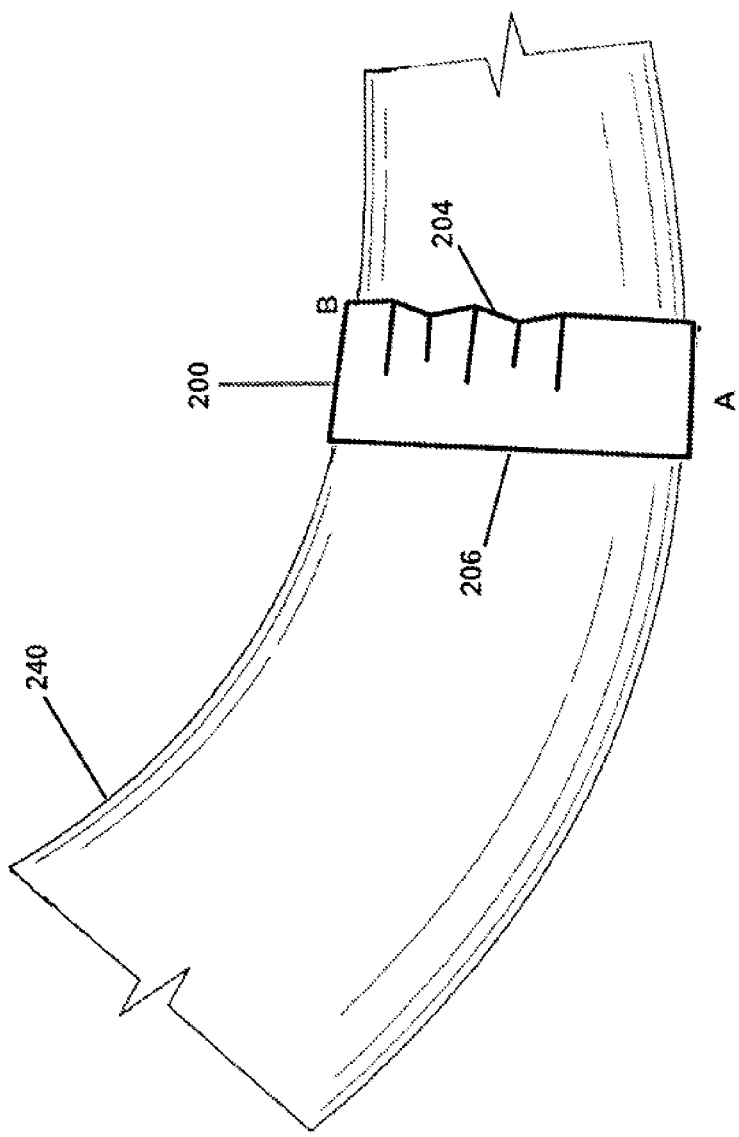
FIG. 2 is a front view illustrating a band clamp assembly with corrugated portions, in accordance with one embodiment of the invention.

The present invention is directed to a novel band clamp 200 that provides a solution to the above problems, while allowing effective coupling/clamping of both non-parallel surfaces and parallel surfaces, or any curvature, without any need for changes in design of the band clamp. The band clamp 200, illustrated in FIG. 2, is configured to effectively secure two or more elements together, for example, securing an insulation sleeve (not shown) on pipe 240 or securing two pipes together. In this regard, the band clamp 200 may provide circumferential and/or radial clamping pressure at areas of contact to adequately secure members together, while resisting vibratory motion. Furthermore, the band clamp 200 may provide structural support to the pipe 240. Specifically, the band clamp 200 comprises a corrugated portion 204 where the inner surface of the band clamp 200 is configured to contact the proximate outer surface of the pipe 240 at locations where the non-corrugated portion 206 fails to make contact, as depicted by FIG. 2 at B. In some embodiments, portions of the corrugations or inward protrusions of the corrugated portion 204 may provide contact with the pipe 240. For example, a plurality of line contacts, or a plurality of discrete contact areas at the protrusions. In other embodiments, the band clamp 200 may be tightened and its tension may be adjusted around the pipe 240 such that, the corrugations are at least partially deformed to provide an area of contact between the corrugated portion 204, along at least a portion of the proximate pipe portion, or provide a complete area of contact. In other embodiments, the band clamp 200 may be tightened and its tension may be adjusted around the pipe 240 such that, the corrugations are at least partially deformed to provide one or more points of contact and/or an area of contact between at least a portion of the corrugated portion 204, along at least a portion of the proximate pipe portion, or provide a substantially complete area of contact throughout the circumference. The term "corrugated" as used herein may refer to crimped, folded, furrowed, fluted, crumpled, creased, wavy, channeled, flexed, puckered, wrinkled, and/or roughened members or portions of members described herein. As such, corrugated or corrugated portions may refer to crimps, folds, furrows, flutes, channels, creases, pleats, waves, ridges, or other deformations. The corrugated portion may be pliable or elastic to a predetermined extent. In some embodiments, while in other embodiments the corrugated portion 204 may be rigid.

Figure 3A:
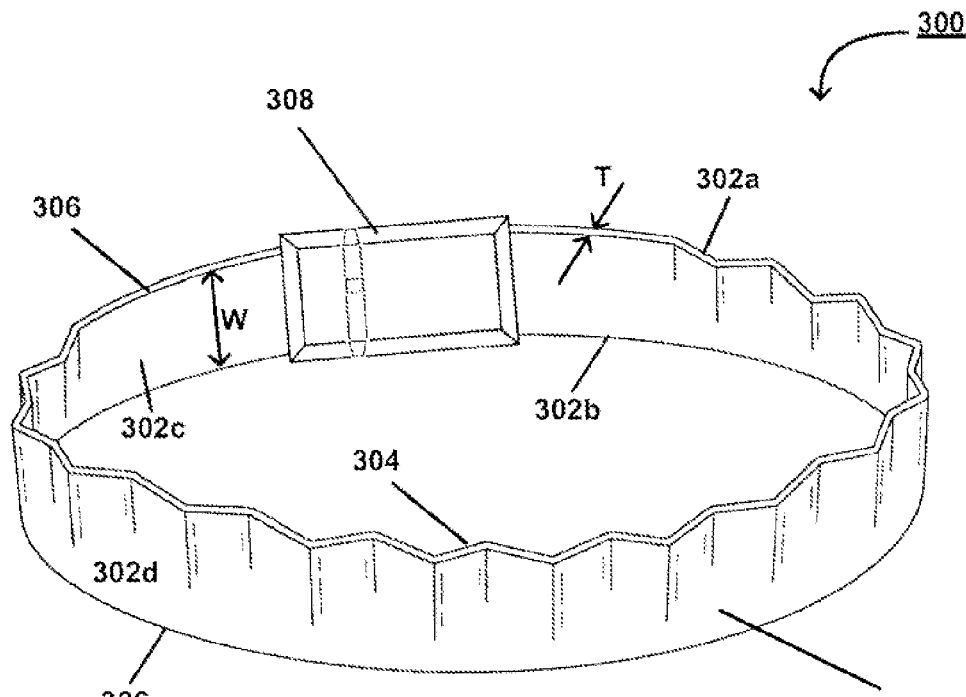
FIG. 3a is a detailed perspective view illustrating a band clamp, in accordance with one embodiment of the invention.
Figure 3B:
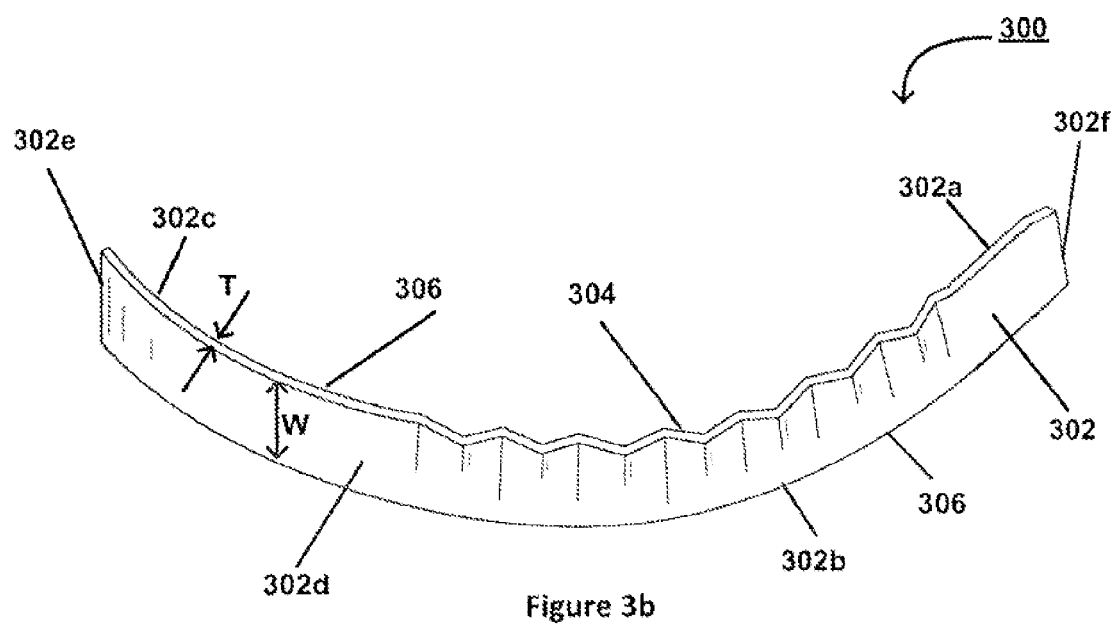

FIGS. 3a and 3b illustrate perspective views of a corrugated band clamp 300. The band clamp comprises an elongate member 302. The elongate member 302 may comprise a first lateral side 302a and an opposing second lateral side 302b. The first lateral side 302a and the second lateral side 302b define a predetermined width W, extending therebetween. In some embodiments, the width W is measured along a plane that intersects the first lateral side 302a and the second lateral side 302b. In some embodiments, the plane is perpendicular to both the first lateral side 302a and the second lateral side 302b at the respective points of intersection. In some embodiments, the width W is measured between tangents associated with surfaces of first lateral side 302a and/or the second lateral side 302b The width W may be constant along the elongate member in some embodiments. In other embodiments, the width W may be variable along the length of the elongate member 302.

Furthermore, the elongate member 302 may comprise a first surface 302c and an opposing second surface 302d, both extending between the first and second lateral sides (302a, 302b). The first and second surfaces (302c, 302d) may be parallel to each other, may be non-parallel or a combination of both along the length. The elongate member 302 may further define a thickness T comprising the distance between the first and second surfaces (302c, 302d), as illustrated in FIG. 3b. In some embodiments, the thickness T may be the perpendicular distance between the first and second surfaces (302c, 302d), at the point of measurement. In some embodiments, the thickness T is constant for the elongate member 302, while in other embodiments, the thickness may be variable along the length of the elongate member 302 and/or the width W of the elongate member 302. The first and second lateral sides (302a, 302b) may extend between a first end 302e and an opposing second end 302f of the elongate member 302. The distance between the first and second ends (302e, 302f) may define a length L (not illustrated) for the elongate member 302, with the length L being constant or variable in various embodiments. The length L may be measured along the first surface 302c, the second surface 302d, the first or second lateral sides (302a, 302b), along a suitable plane or along any suitable curvilinear contour. FIG. 3b illustrates the elongate member 302 as comprising substantially quadrilateral cross-sections. However, it is noted that the elongate member 302 may comprise any suitable polygonal or curvilinear cross-sections. Furthermore, it is contemplated that in some embodiments, the elongate member 302 may also comprise perforations, slots or apertures or desired dimensions at predetermined locations.

FIGS. 3a and 3b further illustrate the elongate member 302 comprising a corrugated portion 304 and a non-corrugated portion 306. The figures illustrate a non-limiting example of the elongate member 302 with corrugated portion 304 positioned along a portion of the length of the first lateral side 302a, with the remaining portion of the first lateral side 302a and the second lateral side 302b comprising non-corrugated portions 306. As such, the corrugated portion 304 may extend along at least a portion of the first lateral side 302a, the second lateral side 302b and/or the first and second ends (302e, 302f) of the elongate member 302. In some embodiments, the elongate member 302 may comprise a plurality of corrugated portions 304, the plurality of corrugated portions comprising same or different structures and dimensions, and being positioned in contiguous manner or an intermittent manner. FIG. 3b, illustrates the elongate member 302 in an open position, while FIG. 3a illustrates the elongate member 302 in a closed position with the ends of the elongate member 302 being secured by a clamp member 308 to form a loop. In some embodiments, the elongate member 302, together with the clamp member 308 comprise the band clamp 300. In some embodiments, the elongate member 302 may be configured to form an open or closed loop, without a clamp member 308, by the virtue of elastic and/or spring-like properties of the material and/or design of the elongate member 302.

The clamp member 308 may be any device, tool, or fastener configured to hold or secure two or more elements together, either by mechanical, magnetic, and/or chemical means. In the context of the band clamp 300, the clamp member 308 is configured to hold, secure, fasten, or lock the ends of the elongate member together, either removably or permanently. Typically, the clamp member 308 is configured to secure the ends of the elongate member together, at a desired tension, such that the elongate member 302 forms a loop. As such, the clamp member 308 may comprise hose clamps, V-Clamps, buckles, locking ties, loops, screw clips, worm drive clips, center punch clamps, spring clamps, wire clamps, ear clamps, strapping seals, cable ties, marman clamps, clasps, band clips, a combination of portions of the preceding non-limiting examples, or any other suitable clamping devices known in the art. In some embodiments, the clamp member 308 is configured to secure the band clamp 300 around another secondary member (for example, a pipe), such that a desired compression (for example, radial and circumferential compression forces) may be applied on the secondary member by changing the circumference/dimensions of the loop formed.

The elongate member 302 and/or the clamp member 308 may be manufactured as multiple components that are then assembled together or the elongate member 302 and the clamp member 308 may be constructed as a single unit. The elongate member 302 and/or the clamp member 308 may be manufactured out of same or different materials, such as suitable grades of stainless steel, carbon steels, suitable metals like aluminum, brass, copper, tin, nickel, titanium, alloys, plastics, composites, natural or synthetic materials, polymers, and the like. The materials may be chosen for the specific application of the band clamp 300, based on their strength, disposition for plastic and elastic deformation without fracture, ductility/malleability, weight, rigidity/flexibility, operative temperature ranges, durability, resistance to fatigue and creep, magnetic properties and the like. In addition, for each material listed above, suitable dimensions of the elongate member 302 may be chosen by considering the cumulative effect of the inherent material properties and characteristics imparted due to design/dimensions. For example, the elongate member 302 may comprise a sheet metal of steel or an aluminum alloy, whose thickness is chosen based on the desired deformation characteristics, ease of forming corrugated portions and the like. As such, the thickness T of the elongate member 302 may be in the range of 0.001 mm to 6 mm (for example, 0.1 mm to 0.6 mm, 0.4 mm to 0.7 mm, 0.2 mm to 1.06 mm, 0.1 mm to 2.5 mm, 2 mm to 3.6 mm, or within, outside or overlapping these ranges), and in ranges of thickness T greater than 6 mm (for example, 2.8 mm to 6.3 mm, 4.3 mm to 9.5 mm, 2.38 mm to 12 mm, or within, outside or overlapping these ranges). Furthermore, based on the application, the materials may be chosen for their corrosion resistance, chemical stability or their properties can be augmented by electroplating or by use of coatings or sprays possessing hydrophobic, lipophobic, oleophobic, or other suitable properties.

Methods of fabricating/manufacturing the corrugated band clamp is discussed below. After choosing an optimal material and thickness of the elongate member 302, the elongate member of desired dimensions is obtained. For example, a sheet of the desired material at optimal thickness is obtained and cut to the desired contour with length L and width W and may further be curved to a desired shape. Typically, the length L and the width W are determined based on the application and the dimensions of the pipe in the band clamp assembly. For example, the length L is chosen such that the length L is greater than or equal to the circumference/perimeter of the pipe and/or elements being claimed at the desired location of assembly. The width W may be chosen, for instance, based on a proportional factor with respect to the length L or a suitable dimension to ensure the structural integrity and strength of the elongate member 302 based on the material. In some embodiments, the thickness of the sheet may be reduced to the desired thickness first using metal forming processes known in the art, link rolling. Corrugations may then be formed at the desired locations of the elongate member 302. Corrugations may be formed using any suitable cold forming, hot forming, or other deformation processes known in the art. For example, corrugated portions 304 may be formed by crimping, stamping, punching, press brake forming, drawing, hydroforming, and the like, using appropriate tooling. A suitable clamping member may be fabricated and affixed to the elongate member at a desired location either before or after the corrugations are formed. The clamping member may be affixed using any permanent or temporary fastening/securing methods known in the art. In some embodiments, the corrugated band clamp 300 or any of the steps described previously may be fabricated using other processes like casting, milling, turning, welding, and the like.

In some embodiments, the corrugated band clamp may be subjected to appropriate heat treatment processes to achieve desired material/structural characteristics/features. The present invention finds applications is a variety of fields that utilize pipes and which require clamping. For example, the corrugated band clamp 300 may be used to secure an insulating sleeve/material around an exhaust pipe. The insulating sleeve may aid in increasing, decreasing or otherwise regulating the temperature of the fluid within the exhaust pipe so that the fluid is emitted at a desired temperature and/or regulating the temperature of the pipe, particularly at weaker regions like bends and curves. In this regard, in some embodiments, the insulating sleeve made of one or more layers of composite materials, resins, polymers, fabrics, and the like. The insulating sleeve may be placed on the outer surface of the pipe at a desired location and the corrugated band clamp may be looped over the sleeve and tightened/secured to hold the insulating sleeve in place. The pipe along with the sleeve and the corrugated band clamp may be subjected to heat treatment, such that the insulating material is at least partially molded to the pipe and associated with the corrugated band clamp.

Figure 4A:
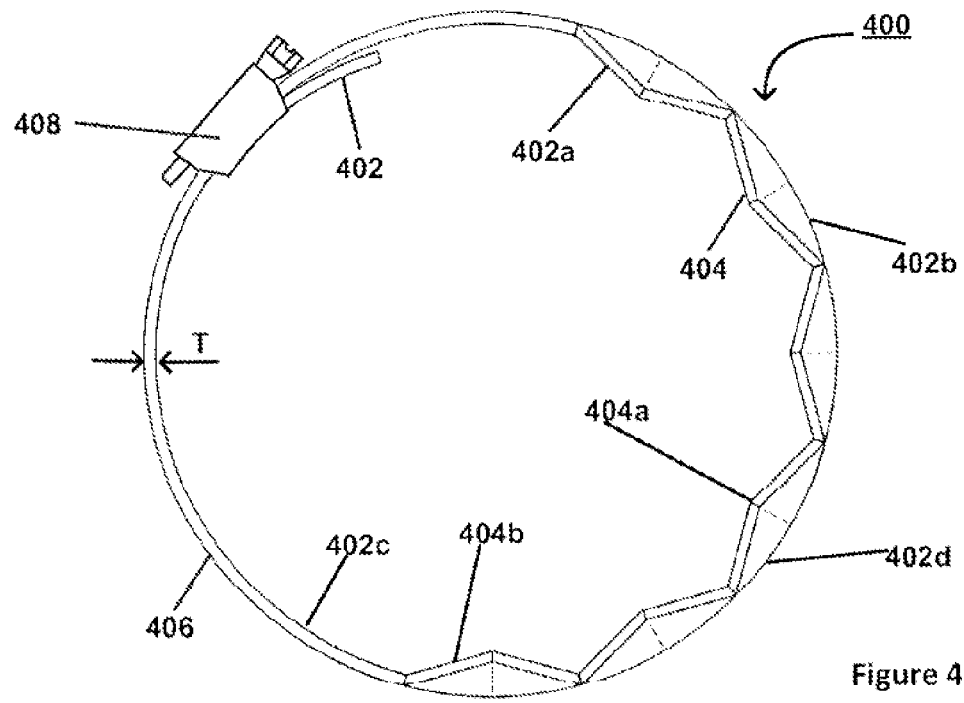
FIG. 4a is a top view of illustrating band clamp, in accordance with one embodiment of the invention.

Now referring to FIG. 4a illustrating a top view of a corrugated band clamp 400, in accordance with some embodiments of the invention. It is noted that, hereinafter in the disclosure, like numbers refer to like elements comprising similar construction, features and characteristics, unless specified otherwise. For example, FIG. 4a illustrates a band clamp 400 with an elongate member 402 comprising first and second lateral sides (402a, 402b), first and second surfaces (402c, 402d), corrugated portion 404, non-corrugated portion 406, and clamp member 408, which are similar to corresponding elements described with respect to FIGS. 3 (300, 302, 302a, 302b, 302c, 302d, 304, 306 and 308 respectively). FIG. 4a illustrates a portion of the length/circumference of the elongate member 402 comprising the corrugated portion 404 on the first lateral side 402a. For example, 10%, 25%, 40%, 50% or 80% of the length of the elongate portion 402 may comprise the corrugated portion 404. In some embodiments, the corrugated portion 404 may correspond to approximately one-fifth, one-quarter, one-half, three-fifths, three-quarters or any suitable portion of the length of the elongate portion 402 along the first lateral side 402a and/or second lateral side 402b. In some embodiments, the first lateral side 402a defines a first area enclosed by the circumference of the elongate member 402 at the first lateral side 402a. Similarly, the second lateral side 402b defines a second area enclosed by the circumference of the elongate member 402 at the second lateral side 402b. In some embodiments, the corrugated portion 402 on the first lateral side 402a, extends into the interior of the loop, away from the first surface 402c, along a substantially radial direction, causing the first area to be smaller than the second area, specifically when the band clamp 400 is assembled with a pipe. It is noted that the corrugated portion 402 may similarly extend outward radially away from the second surface 402d in addition to the inner projection described above, in some embodiments.

FIG. 4a illustrates the corrugated portion 404 with corrugations of similar dimensions (for example, 404a and 404b). However, the dimensions of the corrugations along the circumference of the elongate member 402 and/or along a radial direction away from the first surface 402c may be variable. Although illustrated as being contiguous in FIG. 4a, the corrugated portion 404 may comprise intermittent corrugations with alternating non-corrugated portions 406. FIG. 4a further illustrates the clamp member 408 comprising a screw or a worm gear mechanism. In this regard, rotating the screw may cause changes to the diameter of the circular loop formed by the elongate member 402. This loop may comprise elliptical or other suitable curvilinear contours in other embodiments. Furthermore, during assembly onto a comparatively rigid pipe/member, tightening of the clamp member 408 may cause changes in the shape and dimensions of the loop. Furthermore, the corrugated portion 404 may be pliable and flexible causing the elongated member 402 to further emulate the contour of the pipe. As discussed previously, the corrugated portions of the present invention provide increased area of contact and thereby increased resistance displacement/slip due to vibration in comparison with bands without corrugations.

Figure 4B:
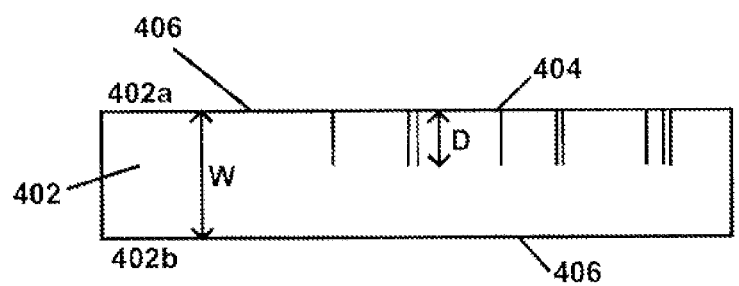
FIG. 4b is a front view illustrating the band clamp of FIG. 4a, in accordance with one embodiment of the invention.
Figure 4C:
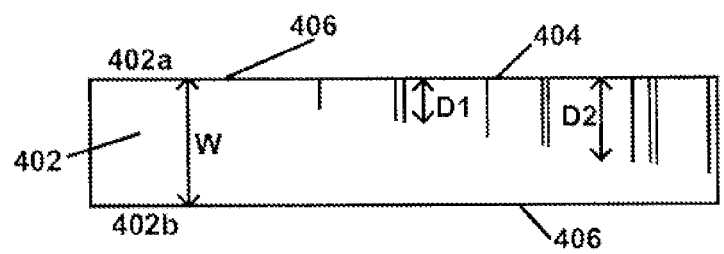
FIG. 4c is a front view illustrating the band clamp of FIG. 4a, in accordance with one embodiment of the invention.
Figure 4D:
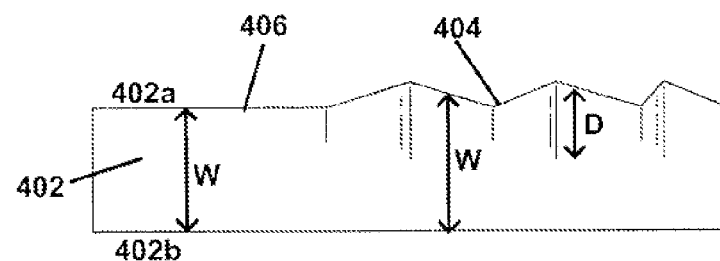
FIG. 4d is a front view illustrating the band clamp of FIG. 4a, in accordance with one embodiment of the invention.

FIGS. 4b to 4d illustrate front views of the corrugated band clamp 400 of FIG. 4a, in accordance with some embodiments of the invention. FIG. 4b illustrates the corrugated portion 404 comprising corrugations with depth D. In some embodiments, the corrugations are perpendicular to the axis of the loop and/or the lateral sides (402a, 402b). The depth D may be uniform (as illustrated in FIG. 4b) or variable along the length of the elongate member 402.

Typically the corrugations of the corrugated portion 404 have a depth D that is at least a portion of the width W of the elongate member 402. For example, the depth D may comprise three-fourth, half, one-fourth, one-eight, one-sixteenth or any other fraction of the dimension of the width W. The depth D may be chosen based on the curvature of the pipe for assembly, based on dimensions of the pipe, based on the material of the elongate member 402 and other factors. In some embodiments, the depth D is equal to the width W such that the corrugations extend through the elongate member. FIG. 4c illustrates the corrugated portion 404 comprising corrugations with varying depths D1 and D2. In this regard, FIG. 4c illustrates the elongate member 402 with gradually varying depths forming a substantially right angled triangle shape, tapering from the right side to the left such that depth D2 is greater than depth D1. In some embodiments, the depths of corrugations of the corrugated portion 404 may be varied such that the corrugations form an isosceles triangle, being symmetric about the deepest corrugation in the center. These gradual variations described above may be positioned appropriately along the curvature of the pipe during assembly, to provide a stronger hold around the pipe. In other embodiments the depths of corrugations may vary in an irregular manner. FIG. 4d illustrates a front view of the band clamp 400. Here, the corrugated portions 404 protrude away from the first lateral side 402a of the non-corrugated portion 406. Therefore, the depth of the corrugated portion D being either constant or variable, in this instance may be at least a portion of the length of the width W and/or greater than the length of the width W.

Figure 5A:
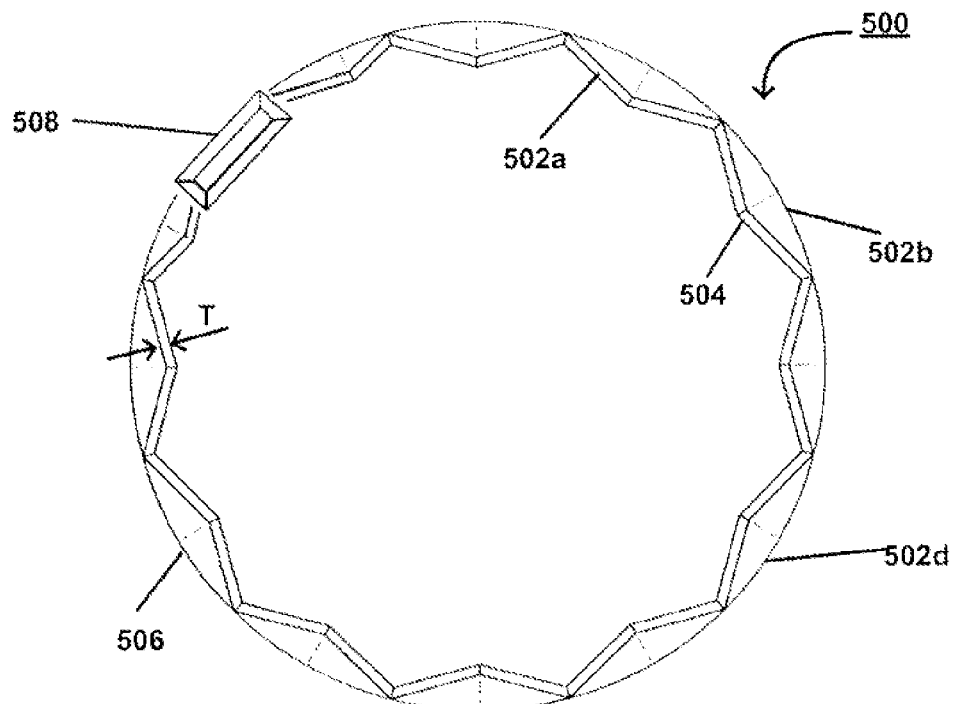
FIG. 5a is a top view illustrating a band clamp, in accordance with one embodiment of the invention.
Figure 5B:
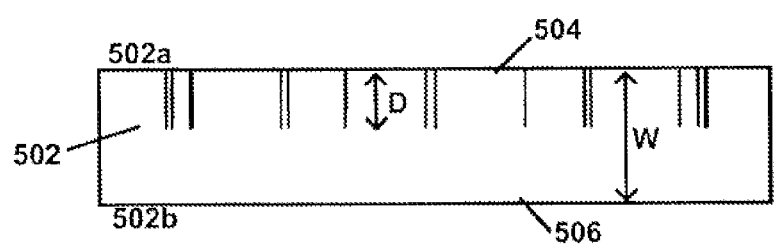
FIG. 5b is a front view illustrating the band clamp of FIG. 5a, in accordance with one embodiment of the invention.
Figure 5C:
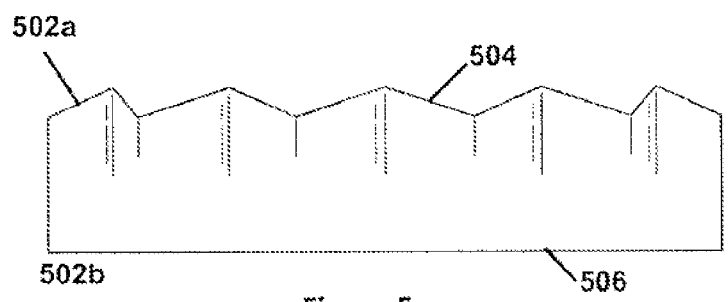
FIG. 5c is a front view illustrating the band clamp of FIG. 5a, in accordance with one embodiment of the invention.

FIG. 5a illustrates a top view of a corrugated band clamp 500 in accordance with one embodiment of the invention. The features illustrated in FIG. 5a may be substantially similar to the corresponding features described with respect to FIGS. 3a and 4a. the corrugated band clamp 500 comprises an elongate member 502 comprising a first and second lateral sides (502a, 502b), second surface 502c, corrugated portion 504, non-corrugated portion 506, defining a width W and thickness T. In this embodiment, the corrugated portion 504 extends throughout the length of the first lateral side 502a. FIG. 5a further illustrates a clamping member 508, which may be similar in structure and function to the clamping members 308 and 408 described previously. FIGS. 5b and 5c illustrate the front views of the band clamp 500. FIGS. 5b and 5c illustrate features of the band clamp 500 that are substantially similar to those described with respect to FIGS. 4b and 4d respectively. The corrugated portion 504 may comprise a depth D.

Figure 6:
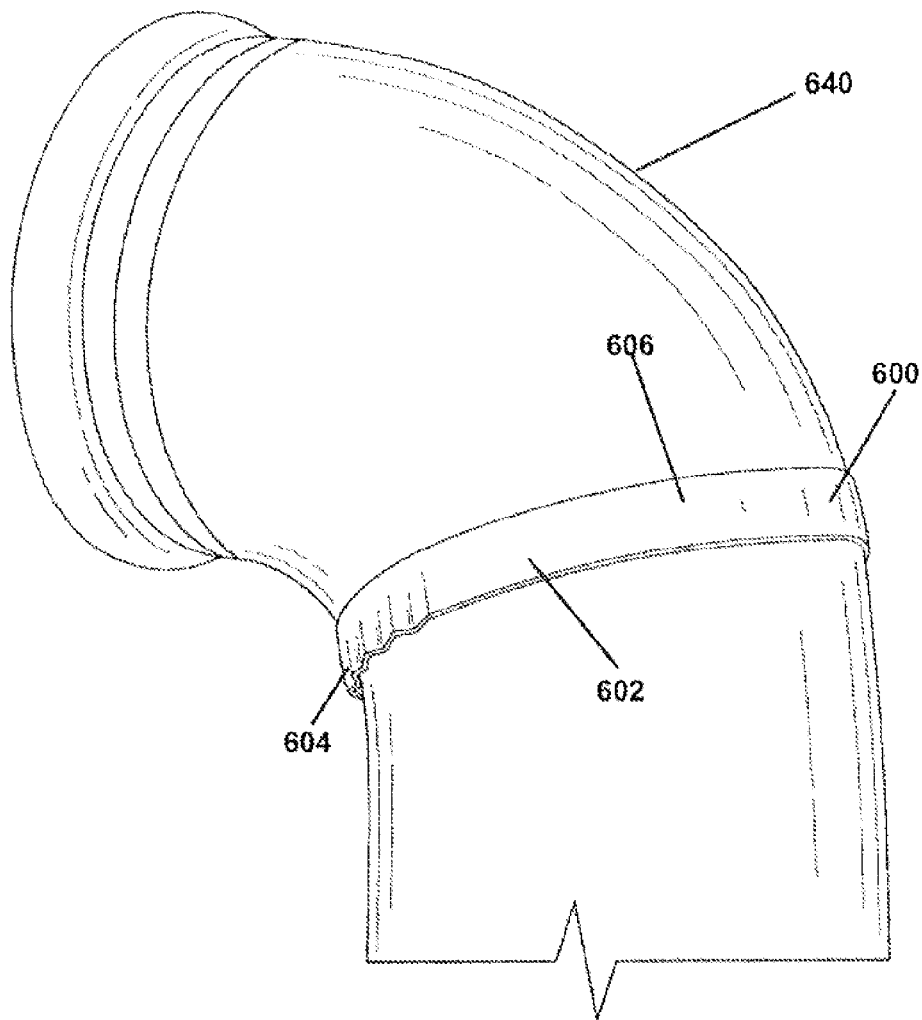
FIG. 6 is a perspective view illustrating a band clamp assembly, in accordance with one embodiment of the invention.

FIG. 6 illustrates a perspective view of a band clamp assembly, in accordance with one embodiment of the invention. Specifically, FIG. 6 illustrates the band clamp assembly with the band clamp 600 positioned at the curvature of a curved/bent pipe 640. Typically, the elongate member 602 of the band clamp 600 is positioned at a suitable location on the surface of the pipe 640. The ends of the elongate member 602 of the band clamp 600 are drawn into a loop around the pipe, using a suitable clamping member (not shown). The elongate member 602 is tightened around the pipe and the ends are secured/locked using the clamping member, causing the diameter of the loop to be reduced and the elongate member to emulate the cross-section of the pipe. In some embodiments, an insulating material is positioned on the outer surface of the pipe, prior to positioning the corrugated band clamp 600. The corrugated band clamp 600 is tightened such that the band clamp 600 provides a compressive force on the pipe and the insulating material, throughout the area of contact, thereby securing the insulating material in the pipe. In some embodiments, the clamping member may be unlocked to remove the band clamp 600 for the pipe. Insulating materials/sleeves, typically refer to materials, covers, and the like that are required to be secured to a pipe to regulate the temperature of the fluid in the pipe and/or the pipe itself, for example, by carrying heat away from the surface of the pipe. In some embodiments, insulating material may also refer to seals, gaskets, and other members that aid in preventing galvanic corrosion between the corrugated band clamp 600 and the pipe.

In some instances, providing corrugations 604 on the elongate member 602 comprises plastic deformation of the elongate member 602. This plastic deformation may cause material in the corrugated portion 604 to lose its elasticity and ductility, at least partially. However, the corrugated portion 604 may exhibit a certain level of pliability and deformability by the virtue of the design of the corrugations formed: based on the size, shape and dimensions of folds, pleats, waves, and the like in the corrugated portion 604 that help the band 600 establish contact with the outer surface of pipe 640. Furthermore, the non-corrugated portion 606 of the elongate member 602 may retain the inherent elasticity of the material due to lack of plastic deformation. Placing the elongate member 602 around the pipe 640 may involve a slight deformation of the elongate member 602. Once positioned around the pipe, the inherent elasticity of the non-corrugated 602 portion may cause the elongate member 602 to wrap around the pipe, with a spring-like mechanism.

Figure 7:
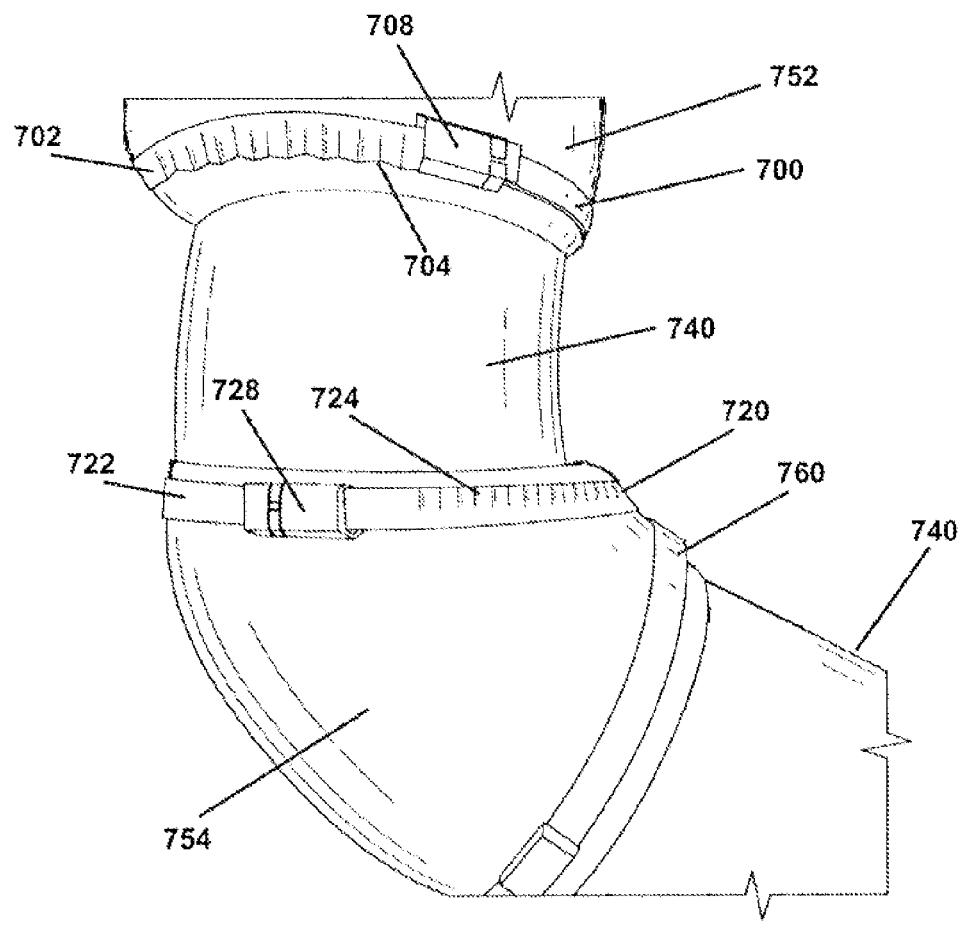
FIG. 7 is a perspective view illustrating a band clamp assembly, in accordance with one embodiment of the invention.

FIG. 7 illustrates a band clamp assembly, in accordance with one application of the corrugated band clamp. Here, two corrugated band clamps 700 and 720 are illustrated in an assembly around a pipe 740. The band clamps secure insulating materials/sleeves 752 and 754 around the pipe 740, respectively. These corrugated band clamps 700 and 720 may be secured using clamping members 708 and 728 respectively, and may be substantially similar to those described previously. Furthermore, corrugated band clamp 700 may comprise an elongate member 702 with a corrugated portion 704. Corrugated band clamp 720 may comprise an elongate member 722 with a corrugated portion 724. FIG. 7 further illustrates a second band clamp 760, comprising entirely non-corrugated portions. Although illustrated as being positioned near the ends of the insulating materials/sleeves 752 and 754, it is contemplated that the band clamps may be positioned at any suitable location, for example at the center of the insulating sleeve.

Figure 8:
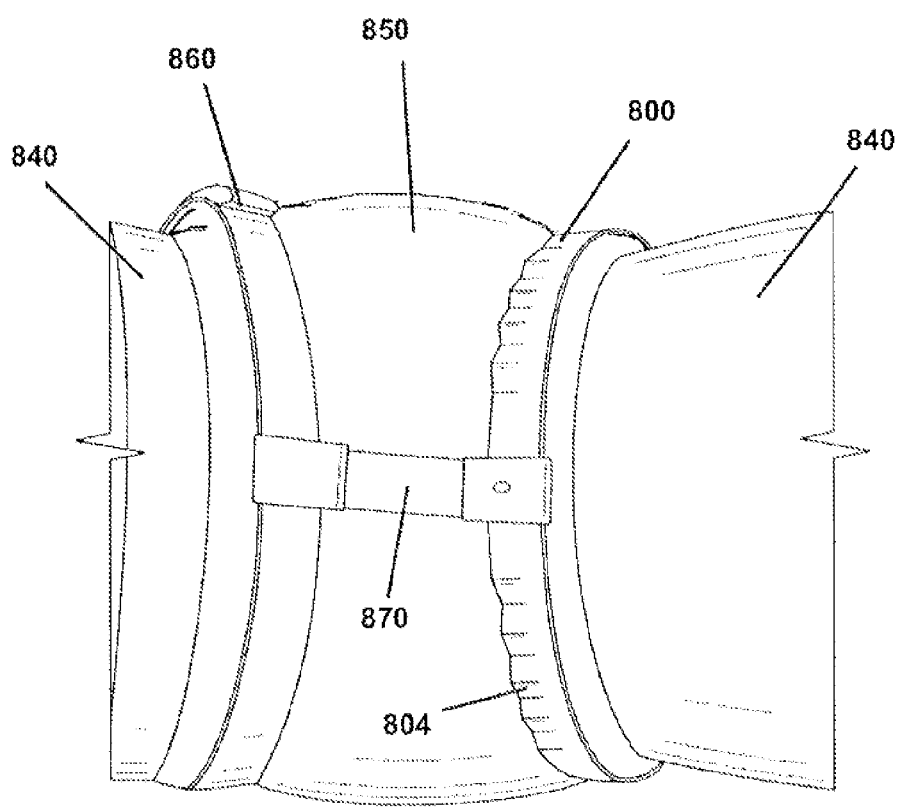
FIG. 8 is a perspective view illustrating a band clamp assembly, in accordance with one embodiment of the invention.

FIG. 8 illustrates a band clamp assembly, in accordance with one application of the corrugated band clamp. The figure illustrates a corrugated band clamp 800 with a corrugated portion 804 and a second, non-corrugated band clamp 860, securing an insulating material/sleeve 850 around pipe 840. A retaining member 870 is also provided to secure the corrugated band clamp 800 and the second band clamp 860 together. The retaining member may be similar in construction to the elongate member and/or the clamping member described previously. The retaining member 870 may comprise a first element with securing means at the ends. The securing means may comprise clips, buckles, clamps and the like, that may be used to secure the elongate members of adjacent band clamps. It is understood that the retaining member may secure multiple corrugated band clamps in some embodiments.

Figure 9:
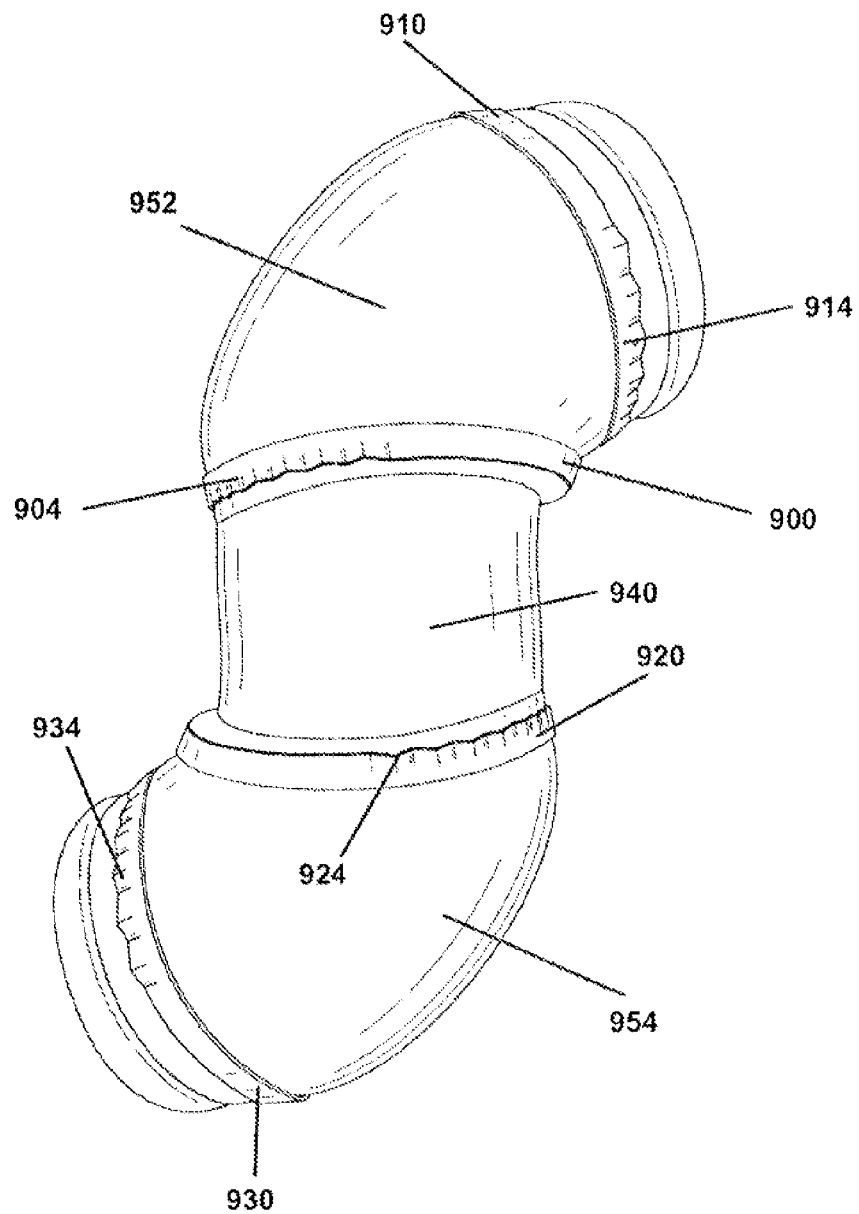
FIG. 9 a perspective view illustrating a band clamp assembly, in accordance with one embodiment of the invention.

FIG. 9 illustrates a band clamp assembly, in accordance with yet another application of the corrugated band clamp. This application illustrates the use of four corrugated band clamps securing two insulation sleeves. In this regard, the corrugated band clamps 900 and 910 secure the insulating material/sleeve 952, while the corrugated band clamps 920 and 930 secure the insulating sleeve 954 on the pipe 940. Corrugated band clamp 900 may comprise a corrugated portion 904, while the corrugated band clamp 910 may comprise a corrugated portion 914, in a staggered arrangement. Similarly, corrugated band clamp 920 may comprise a corrugated portion 924, while the corrugated band clamp 930 may comprise a corrugated portion 934.

While the present invention has been disclosed with reference to certain embodiments, numerous modifications, alterations and changes to the described embodiments and other new embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the sphere and scope of the appended claims. Although specific terms are employed herein, they are used in a generic and descriptive sense only and not for purposes of limitation. Accordingly, it is intended that the present invention not be limited to the described embodiments, but that it has the full scope defined by the language of the following claims, and equivalents thereof. In addition, where possible, any terms expressed in the singular form herein are meant to also include the plural form and/or vice versa. As used herein, "at least one" shall mean "one or more" and these phrases are intended to be interchangeable. Accordingly, the terms "a" and/or "an" shall mean "at least one" or "one or more," even though the phrase "one or more" or "at least one" is also used herein. Furthermore, references to "one embodiment" of the present invention are not intended to be interpreted as excluding the existence of additional embodiments that also incorporate the recited features. The following claims are in no way intended to limit the scope of the disclosure to the specific embodiments described herein. While the foregoing is directed to embodiments of a corrugated band clamp, and components thereof, other and further embodiments may be devised without departing from the basic scope thereof, and the scope thereof is determined by the claims that follow.

What is claimed is:

1. A clamping apparatus for securing insulating sleeves on pipes, comprising:
 a first elongate member having a first lateral side and an opposing second lateral side, and a predetermined width extending therebetween, the first elongate member having a predetermined length, wherein the first elongate member defines a first end and an opposite second end such that the first end and the second end terminate the first elongate member, and an intermediary section extending from the first end to the second end, wherein the first end and second end are non-corrugated, the first lateral side of the intermediary section is corrugated along the entire length of the first lateral side of the intermediary section and the second lateral side of the intermediary section is not corrugated, wherein the corrugation of the intermediary section is structured to extend radially into an interior of a loop of the first lateral side to reduce an inner area defined by the first lateral side and wherein the intermediary section comprises a solid surface along the entire length and width of the intermediary section.

2. The clamping apparatus of claim 1, wherein the intermediary section is corrugated proximate the first lateral side and the second lateral side.

3. The clamping apparatus of claim 1, wherein the corrugation of the intermediary section defines a predetermined constant depth.

4. The clamping apparatus of claim 1, wherein the corrugation of the intermediary section defines a variable depth.

5. The clamping apparatus of claim 1 wherein the clamping apparatus further comprises:
 a clamping member, wherein the clamping member is configured to secure the first and second ends relative to one another to form the loop.

6. The clamping apparatus of claim 1, wherein the clamping apparatus further comprises:
 a second elongate member having a first lateral side and an opposing second lateral side, and a predetermined width extending therebetween, the second elongate member having a predetermined length, wherein the second elongated member defines a first end and a second end and intermediary section extending therebetween, wherein the first end and second end are non-corrugated and the intermediary section is corrugated along the entire length of the intermediary section, wherein the corrugation of the intermediary section is structured to extend radially into an interior of a loop of the first lateral side to reduce an inner area defined by the first lateral side.

7. The clamping apparatus of claim 6, wherein the clamping apparatus further comprises:
 a retaining member comprising a first end and a second end; and
 wherein the first end of the retaining member is structured to secure the first elongate member and the second end of the retaining member is structured to secure the second elongate member.

8. A method of manufacturing a clamping apparatus for securing insulating sleeves on pipes, the method comprising:
 providing an elongate member having a first lateral side and an opposing second lateral side, and a predetermined width extending therebetween, the elongate member having a predetermined length, wherein the elongate member defines a first end and an opposing second end such that the first end and the second end terminate the first elongate member, and an intermediary section extending from the first end to the second end forming corrugations along at least the portion of the length of the elongate member such that the first end and second end are non-corrugated, the first lateral side of the intermediary section is corrugated along the entire length of the first lateral side of the intermediary section and the second lateral side of the intermediary section is not corrugated, wherein the corrugation of the intermediary section is structured to extend radially into an interior of a loop of the first lateral side to reduce an inner area defined by the first lateral side and wherein the intermediary section comprises a solid surface along the entire length and width of the intermediary section; and
 providing a clamping member, wherein the clamping member is configured to secure the first and second ends relative to one another to form a loop.

9. The method of claim 8, wherein the method further comprises securing the clamping member to the elongate member.

10. A method of using a clamping apparatus for securing insulating sleeves on pipes, the method comprising:
 providing a clamping apparatus, wherein the clamping apparatus comprises:

an elongate member having a first lateral side and an opposing second lateral side, and a predetermined width extending therebetween, the elongate member having a predetermined length, wherein the elongate member defines a first end and an opposing second end such that the first end and the second end terminate the first elongate member, and an intermediary section extending from the first end to the second end, wherein the first end and second end are non-corrugated, the first lateral side of the intermediary section is corrugated along the entire length of the first lateral side of the intermediary section and the second lateral side of the intermediary section is not corrugated, wherein the corrugation of the intermediary section is structured to extend radially into an interior of a loop of the first lateral side to reduce an inner area defined by the first lateral side and wherein the intermediary section comprises a solid surface along the entire length and width of the intermediary section;

providing a clamping member, wherein the clamping member is configured to secure the first and second ends relative to one another to form a loop;

providing a pipe, the pipe having an outer surface;

positioning the clamping apparatus proximate the outer surface of the pipe;

positioning the first end and the second end in the clamping member, such that the elongate member forms the loop around the pipe; and securing the clamping apparatus at the outer surface of the pipe, wherein securing the clamping apparatus comprises modifying dimensions of the loop.

11. The method of claim 10, wherein positioning the clamping apparatus proximate the outer surface of the pipe, further comprises:

providing an insulating material;

positioning the insulating material around at least a portion of the outer surface of the pipe; and positioning the clamping apparatus proximate the insulating material such that the insulating material is secured between the clamping apparatus and the outer surface of the pipe.

* * * * *